US007386889B2

(12) United States Patent
Shay

(10) Patent No.: US 7,386,889 B2
(45) Date of Patent: Jun. 10, 2008

(54) SYSTEM AND METHOD FOR INTRUSION PREVENTION IN A COMMUNICATIONS NETWORK

(75) Inventor: A. David Shay, Lawrenceville, GA (US)

(73) Assignee: Trusted Network Technologies, Inc., Alpharetta, GA (US)

( * ) Notice: Subject to any disclaimer, the term of this patent is extended or adjusted under 35 U.S.C. 154(b) by 795 days.

(21) Appl. No.: 10/065,775

(22) Filed: Nov. 18, 2002

(65) Prior Publication Data

US 2005/0160289 A1 Jul. 21, 2005

(51) Int. Cl.
*H04K 1/00* (2006.01)
*G06F 7/04* (2006.01)
*G06F 17/30* (2006.01)

(52) U.S. Cl. .............................. 726/26; 726/13; 726/28; 726/29; 713/182

(58) Field of Classification Search ................. 713/153, 713/182; 726/22, 13, 26
See application file for complete search history.

(56) References Cited

U.S. PATENT DOCUMENTS

| | | | |
|---|---|---|---|
| 5,689,566 A * | 11/1997 | Nguyen ...................... | 713/155 |
| 5,796,942 A * | 8/1998 | Esbensen ..................... | 726/13 |
| 5,802,178 A | 9/1998 | Holden et al. | |
| 5,872,847 A | 2/1999 | Boyle et al. | |
| 6,219,786 B1 * | 4/2001 | Cunningham et al. ....... | 713/152 |
| 6,219,787 B1 * | 4/2001 | Brewer ....................... | 713/167 |
| 6,275,942 B1 | 8/2001 | Bernhard et al. | |
| 6,279,113 B1 | 8/2001 | Vaidya | |
| 6,317,831 B1 | 11/2001 | King | |

(Continued)

FOREIGN PATENT DOCUMENTS

CA 2286534 A 4/2001

(Continued)

OTHER PUBLICATIONS

Phifer, "Cost-Effective Remote End Point Protection: Against Trojans, Spyware, and Other Pests," PestPatrol White Paper, Sep. 1, 2002, pp. 1-11.

(Continued)

*Primary Examiner*—Nasser Moazzami
*Assistant Examiner*—Christopher J Brown
(74) *Attorney, Agent, or Firm*—Morris, Manning & Martin, LLP

(57) ABSTRACT

A method, system and program for preventing intrusion in a communications network. A source node initiates a request for network services, such as session establishment, database access, or application access. Known network resources and authorized user information is stored in a database at a network portal along with access policy rules that are device and user dependent. Identification of the source node is required before the source node can construct a transformed packet header that is included with a synchronization packet before transmission to a destination node. An appliance or firewall in the communications network receives and authenticates the synchronization packet before releasing the packet to its intended destination. The authentication process includes verification of the access policy associated with the source node. Once received at the destination node, the transformed packet header is reformed by extracting a key index value. The extracted key index is subsequently used to transform the packet header in the response transmitted to the source node.

29 Claims, 9 Drawing Sheets

U.S. PATENT DOCUMENTS

| | | | |
|---|---|---|---|
| 6,363,489 | B1 | 3/2002 | Comay et al. |
| 6,370,648 | B1 | 4/2002 | Diep |
| 6,408,391 | B1 | 6/2002 | Huff et al. |
| 6,742,118 | B1 * | 5/2004 | Doi et al. ................... 713/176 |
| 2001/0023482 | A1 | 9/2001 | Wray |
| 2001/0054159 | A1 | 12/2001 | Hoshino |
| 2002/0004847 | A1 * | 1/2002 | Tanno ....................... 709/249 |
| 2002/0029337 | A1 | 3/2002 | Sudia et al. |
| 2002/0078202 | A1 | 6/2002 | Ando et al. |
| 2002/0078354 | A1 | 6/2002 | Sandhu et al. |
| 2002/0083343 | A1 | 6/2002 | Crosbie et al. |
| 2002/0087882 | A1 | 7/2002 | Schneier et al. |
| 2002/0103916 | A1 | 8/2002 | Chen et al. |
| 2002/0107953 | A1 | 8/2002 | Ontiveros et al. |
| 2002/0112185 | A1 | 8/2002 | Hodges |
| 2002/0129264 | A1 | 9/2002 | Rowland et al. |
| 2002/0133586 | A1 | 9/2002 | Shanklin et al. |
| 2002/0133698 | A1 | 9/2002 | Wank |
| 2002/0133721 | A1 | 9/2002 | Adjaoute |
| 2002/0136407 | A1 | 9/2002 | Denning et al. |
| 2003/0088791 | A1 * | 5/2003 | Porras et al. ................ 713/201 |
| 2004/0034771 | A1 * | 2/2004 | Edgett et al. ................ 713/168 |
| 2004/0215771 | A1 * | 10/2004 | Hayes ....................... 709/225 |

FOREIGN PATENT DOCUMENTS

WO          WO 02/061510 A       8/2002

OTHER PUBLICATIONS

Sungard, "Welcome to the Info Security Performance Model," SunGard Assessment Tool, Sep. 1, 2002, pp. 1-2.
Westbridge, "XML Web Services Security—Going Production," Westbridge White Paper, Sep. 1, 2002, pp. 1-7.
Top Layer, "Stopping Attacks: The Importance of Denial of Service (DoS) Security Appliances," Top Layer White Paper, pp. 1-13.
Internet Security, "Complete Desktop Protection for The Enterprise," ISS Technical White Paper, Sep. 1, 2002, pp. Cover, 1-6.
Internet Security, "Web Application Protection: Using Existing Protection Solutions," ISS Technical White Paper, Jul. 1, 2002, pp. Cover, 1-6.
Top Layer, "Preventing Cyber Attacks and Costly Network Degradation," Top Layer Webcast, May 30, 2002, pp. 1-13 (slides); pp. 1-15-(transcript).
Okena, "A Primer on Preventing Attacks at the Host—Okena, Inc.—Hurwitz Report," Hurwitz Analyst White Paper, Feb. 1, 2002, pp. 1-11.
Blue Lance, "Protecting Computer-Managed Assets: Building a Secure Infrastructure for Business," Larstan Business Reports, Jan, 1, 2002, pp. 1-10.
Okena, "Technology Best Practices for Intrusion Prevention," Okena Analyst White Paper, Jan. 1, 2002, pp. 1-3.
Computel, "Distributed Denial of Service Attacks," Network Security White Papers, Dec. 6, 2000, pp. 1-6.
Leithauser, "Fire Guardian," KnowledgeStorm Solution Detail Report, 2002, pp. 1-2.
Lockstep, "WebAgain—Automatic Web Site Repair," KnowledgeStorm Solution Detail Report, 2002, pp. 1-4.
Kobelt, NetSentron, KnowledgeStorm Solution Detail Report, 2002, pp. 1-3.
Internet Security, "RealSecure® SiteProtector for Enterprise Protection," KnowledgeStorm Solution Detail Report, 2002, pp. 1-5.
Internet Security, "BlackICE PC Protection," KnowledgeStorm Solution Detail Report, 2002, pp. 1-5.
Internet Security, "System Scanner®," KnowledgeStorm Solution Detail Report, 2002, pp. 1-5.
Internet Security, "Internet Scanner™," KnowledgeStorm Solution Detail Report, 2002, pp. 1-6.
Dynamics, "WebInspect™ (Web Application Security Assessment)," KnowledgeStorm Solution Detail Report, 2002, pp. 1-5.
Barham, et als., "Techniques for Lightweight Concealment and Authentication in IP Networks," Intel Research Berkeley, Jul. 2002, pp. 1-12, IRB-TR-02-009, Intel Corp., U.S.A.
International Search Report Dated Apr. 29, 2004, from Corresponding International Application No. PCT/US03/36713, Filed Nov. 17, 2003.
Adolfo Rodriguez, John Gatrell, John Karas, Roland Peschke, "TCP/IP Tutorial And Technical Overview," Online, Aug. 2001, IBM Internet XP002276979, retrieved from the Internet, URL: WWW.IBM.COM/READBOOKS, retrieved on May 21, 2003, p. I-p. XVIII, p. 665-p. 780.
Hunt, R., "Internet/Intranet FirewallSecurity-Policy, Architecture And Transaction Services," Computer Communications, Butterworths & Co. Publishers Ltd., GB, vol. 21, No. 13, Sep. 1, 1998, pp. 1107-1123, XP004146571 ISSN: 0140-3664, p. 111, right-hand column, p. 1113, right-hand column, figures 2-4.

* cited by examiner

SYSTEM AND METHOD FOR INTRUSION PREVENTION IN A COMMUNICATIONS NETWORK

BACKGROUND OF INVENTION

This invention relates generally to network security. More specifically, the invention relates to a system and method for providing trusted communications and preventing intrusions in computer communications networks from occurring.

In the current state of the art, the common approach to communications network security is an attempt to identify occurrences of attacker activity after the attacker is present. This requires infrastructure inspections of every packet flow and a state-full inspection at the packet level. After performing all of this work most of these approaches only provide alert messaging of active breaches, thousands of them. Other approaches in security utilize personal encrypted keys and key authentication. These approaches while providing an attempt at session level control carry additional concerns and limitations associated with Quality of Service (QOS) performance impacts along with the need to add additional information to each packet; thus, by looking at the packet, intruders have a clear picture of how and where to modify new packets. In the present context QOS refers to the overall throughput and performance of a network infrastructure. Most corporate security approaches also include anti-viral, signature verification and Network Address Translation (NAT) implementations. NAT enables a local area network to use one set of Internet Protocol (IP) addresses for internal traffic and a second set of addresses for external traffic. Recent attempts have been made to apply flow-based logic to identify hacker activity. However, like their predecessors, these new approaches still rely on "after intrusion" recognition. While improvements have been made to keep up with today's high-speed line rates, intrusion detection is still just that, detection not prevention.

Network security is of paramount importance to network administrators today. Cyber attacks are becoming more frequent and more publicized. Concerted cyber attacks by terrorist organizations can wreak havoc on the infrastructure that modern societies have come to depend upon. The common methods of attack include network packet sniffing, Internet Protocol (IP) spoofing, password attacks, denial of service attacks and application layer attacks. All of these methods require gaining access to the network and no comprehensive solution exists in the prior art to prevent all forms of network intrusion.

A current effort to provide secure private communications over the Internet is Internet Protocol Security (IPSec). This framework uses encryption technology to provide confidentiality, integrity and authenticity between peer devices in a private communications network. The IPSec protocol is a set of security extensions to the TCP/IP protocol that uses cryptographic techniques to protect the data in a message packet. The main transformation types are authentication header (AH) transformation and encapsulating security payload (ESP) transformation. AH transformation provides for authentication of the sender of data. ESP transformation provides for authentication of the sender and encryption of data. Both types of transformations can be made in either transport or tunnel mode. Transformation in transport mode means that the original packet IP header will be the IP header for the transformed packet. Transformation in tunnel mode means that the packet is appended after a new IP header. Both AH and ESP transformations add an extra header to the message packet, i.e., an AH header or an ESP header. Separate key protocols can be selected including the Internet key Exchange (IKE). Session keys have to be exchanged between communicating peers in order to provide secure communications. Although IPSec does address certain aspects of network security, it is not a panacea for all types of attacks. The use of an AH transformation does not protect the confidentiality of data; the use of an ESP transformation protects the confidentiality of data, but also requires key exchange, the use of additional headers increasing packet overhead, and the encryption of the actual data payload.

There is a critical need for an improved method and system for providing network security that actually prevents intrusions into the network and provides trusted communications between devices in the network.

SUMMARY OF INVENTION

The present invention provides an access control and user session layer security framework. It prevents unwanted connections to new and existing computing resources. It prevents unknown devices and/or users from establishing communication connections to the infrastructure. It prevents unknown devices and/or users from establishing sessions to shared application resources. It prevents known users from gaining access to application resources that are not required in the execution of their area of responsibility.

Unlike traditional intrusion detection systems, the present invention prevents intrusions rather than simply alerting a network administrator that an intrusion is occurring. The technique used by this invention is the first security approach that links business process to enabled technology utilization; thereby preventing anomalies in access and session establishment. It utilizes authentication through real-time protocol manipulation.

The invention requires granted authentication at the hardware and user session levels; thus linking hardware access to user requested services. By securing granted permissions at these levels, strange or unknown hardware devices are prevented from communicating with the network infrastructure; thus preventing threats associated with "walk-in" intrusions. Additionally, application resources are secured by controlling where user sessions are allowed; thus preventing "insiders" from gaining access to non-permitted resources and data.

The invention prevents the initiation of communication establishment through extended manipulation of the communication protocol. This approach places the decision point to the forefront of connection establishment rather than current methods of detecting unwanted "active" utilization or flow. It also eliminates the requirement for "state-full" inspection of every packet associated with end-to-end flows of utilization; thus lowering the performance burden normally associated with intrusion detection.

The two major components of the invention are a "key master" software component that is added to individual user workstations and network resources, and a "gate keeper" component that can be added to existing firewall devices or operate as a stand alone appliance within a trusted virtual network. The key master software constructs a "transformed" packet header for a synchronization packet before transmitting the packet to a destination node. The gate keeper component is an in-line appliance or software module that intercepts all packet flows associated with a protected trusted virtual network. It processes the initial synchronization packet received from a transmitting node and releases every other packet without further delay. The synchronization packets are inspected to ensure that known hardware and known users are requesting services for network resources that they can access. This inspection is performed by examination of the transformed packet header in the received synchronization packet. Information contained in the synchronization packet is compared to access policy profiles stored in a relational database management system at a network portal. Decisions to permit or reject the request for access to network services are made based on these comparisons. At the receiving end of a connection request, key master software in the receiving node initially identifies packet type and evaluates a packet header field to determine whether to continue processing the packet. Authorization and verification are performed by extracting and transforming data in packet header fields and passing the data to upper protocol layer stack processes. The key master software in the destination node toggles into a conversation mode throughout the rest of the connection until both the originating and destination nodes are informed of the connection's termination.

BRIEF DESCRIPTION OF DRAWINGS

The invention is better understood by reading the following detailed description of an exemplary embodiment in conjunction with the accompanying drawings, wherein.

DETAILED DESCRIPTION

Figure 1:
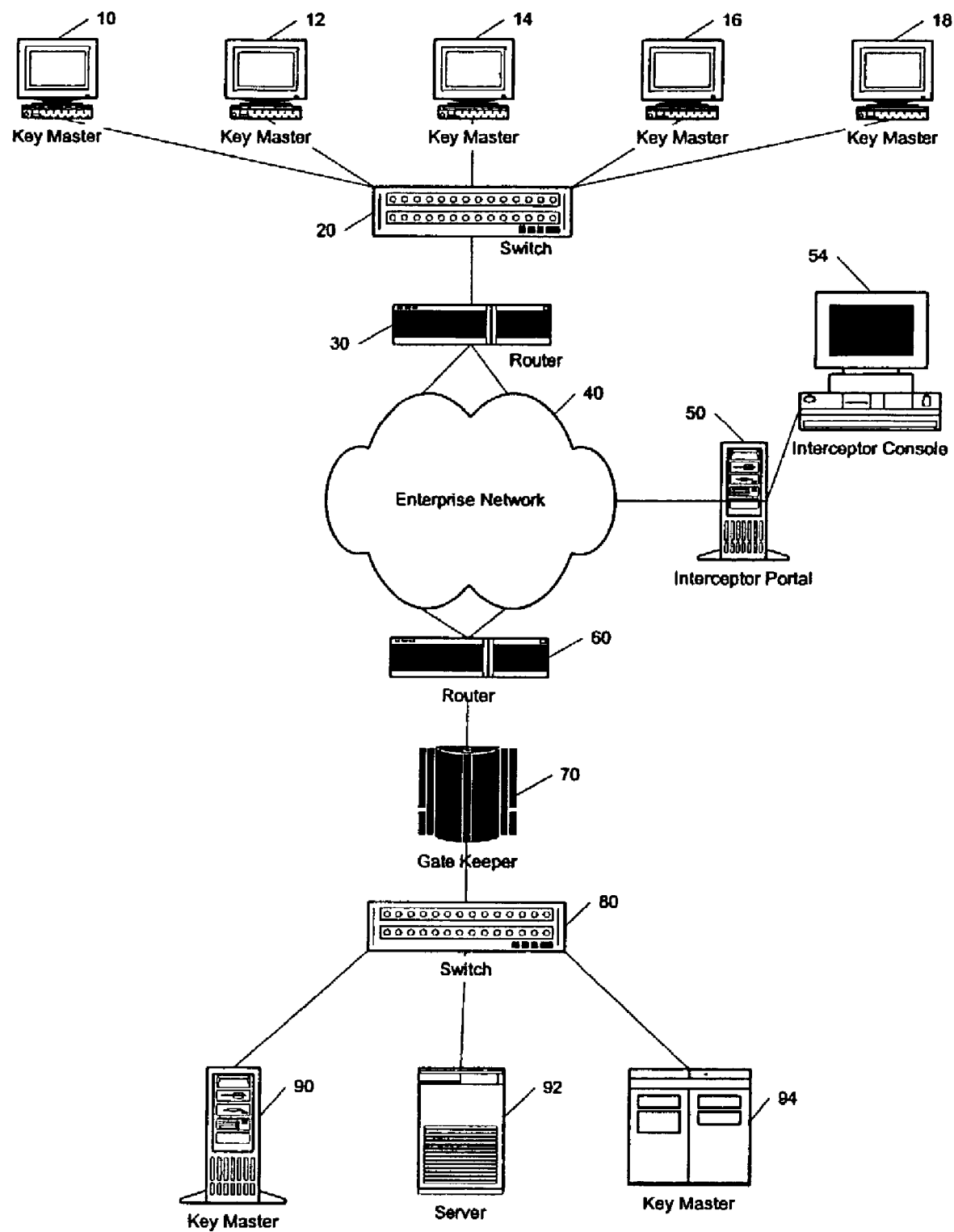
FIG. 1 illustrates a system architecture for implementation of the present invention in accordance with an exemplary embodiment.

The following detailed description of the present invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without using other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

The objective of the invention is to prevent intrusion before it occurs by identifying intruders when they try to establish a connection. This new approach not only delivers a pre-emptive methodology addressing outside intruders but addresses internal intruders as well. Outside intruders are defined as devices originating from the "outside" or off-net who are attempting to connect to resources located within the enterprise infrastructure. Internal intruders are devices connected within the infrastructure that are attempting to connect to unauthorized internal resources.

Unlike other solutions available today, the invention correlates each request for service with the individual making the request and applies availability rules to the users' identification without tagging or modifying packets. The invention utilizes the normal features of protocol operation and exploits how the protocol works to provide authenticated user level security. This approach delivers a secure method of communications without demanding abnormal construction of packet level data.

The prevention of unwanted communication is best served by simply not allowing the communication to begin. As an example, when a local telephone company wants to prevent unwanted telephone usage, they simply remove the dial tone. Without receiving a dial tone, a communication circuit cannot be opened. Much like the telephone, computers rely on the closure of a virtual circuit to a destination address or device. By applying intelligent decision making capability at the point of a request, unwanted or unallowable connection closure can be terminated before it begins.

Resource and delay requirements for this approach will be lower than the traditional approaches as the requirement for continuous state-full inspection of all flow related packets is eliminated. By applying intelligent decision capability at the beginning of a request for connection, only the first few packets must be inspected. The hand-shaking functions of all connection-oriented protocols during initial call setup provide enough information about the request for service to make the decision whether to acknowledge and allow the connection to be made or to terminate and drop the request. In addition, after a connection is established information held within the first few packets can also be inspected to determine the nature of an acknowledged connection request and to recognize the nature of the user's intent. As an example, denial of service attacks can be identified by evaluating the interaction of the first five packets of the bi-directional flow between two nodes. Once the system of the present invention has recognized that initial interaction as damaging, it can automatically terminate the connection.

Signature or anti-virus enabled methods of countering virus-based transmissions can be fully supported by including anti-virus enabled software within the system of the invention. This additional feature would be available through direct partnership with anti-virus software vendors such as Network Associates (McAfee security products) or Norton Utilities.

The following connection scenarios are addressed by the present invention-:

Intercept software-enabled devices connecting to other intercept software-enabled devices.

Intercept software-enabled devices connecting to non-intercept software-enabled devices.

Non-intercept software-enabled devices connecting to intercept software-enabled devices.

Non-intercept software enabled devices connecting to other non-intercept enabled devices.

Scenario 1 can be described as an internal device connecting to a corporate application host. The origination node requests a connection with an application host that is within the trusted corporate enterprise. The request for connection is routed through the enterprise and is evaluated by the corporate firewall already protecting the data center, if a firewall is present. An intercept software program looks at the connection request and ensures that the device making the request is a known node and the authenticated user has permission to utilize the requested application. Once it has been cleared, the request continues on its way to the host destination. The host destination then responds back to the origination node. Within this response are key indicators that inform the node's intercept software that it has indeed connected to an intercept software-enabled or approved device; thus allowing the continuation of the conversation.

Scenario 2 can be described as an intercept software-enabled device connecting to a non-intercept software-enabled host. This scenario is applied equally to both internally located hosts and remote hosts. In either case, a "gate keeper" software program evaluates compliance. The originating node request is evaluated by the gate keeper software program implemented as an appliance or running within the firewall, thus ensuring permissions to connect to the selected host are given. The response does not contain the key indicators provided by an intercept software-enabled device. The intercept software running in the workstation recognizes that it has connected to non-intercept software-enabled device and still continues the conversation. Because each original request for connection is first evaluated by the gate keeper software implemented as an appliance or running within protected firewalls, only permitted requests can complete their connections.

Scenario 3 describes a non-intercept software-enabled device attempting to connect to an intercept software-enabled device. This scenario also addresses both internal and external devices. Internal devices are considered first. As with all other internal originating requests, the gate keeper software implemented as an appliance or running within the firewall evaluates the request from the internal device. It will recognize that the requesting device is not a known intercept software-enabled device; by applying an exception policy to the request, gate keeper software will determine if the request is allowed. If allowed, gate keeper software will inform the receiving device that it has been cleared and is allowed to respond. If the request fails the exception policy, gate keeper will drop the request thus terminating the request. This approach prevents non-allowed connections from reaching the protected host. If the requesting device is entering from outside the network (off net), the gate keeper software also, processes the exception policy in the same manner. However, this scenario also can include an internal device that has been inserted into the enterprise inappropriately, bypassing the gate keeper software or firewall. In this case, the originating device will reach the destination device (server) with a request. However, the intercept software-enabled server either terminates the request or responds back to the originating device with an inappropriate response. The connection will be terminated by the IP protocol in its normal handling of broken connections.

Scenario 4 describes non-intercept software-enabled devices connecting with other non-intercept software-enabled devices. By requiring all protected internal enterprise devices to be intercept software-enabled, no unknown devices will pass the intercept software inspection within the gate keeper protecting a trusted virtual network. Corporations that have the requirement for "outside" or global availability such as the world wide web (HTTP) and Simple Mail Transfer Protocol (SMTP) servers to be used within their buildings can provide a dedicated domain or virtual local area network (VLAN) that only has outside communication abilities.

System Architecture

The system architecture of the intercept solution of the present invention includes the following components: portal, key master software, gate keeper software and an intercept management console. FIG. 1 illustrates the system architecture of the present invention pictorially. The figure depicts users 10, 12, 14, 16, 18 connected via switch 20 and router 30 to the enterprise network 40. The enterprise network 40 can be a wide area network using the Transmission Control Protocol/Internet Protocol (TCP/IP) for network communications between devices and users. Inside the enterprise network 40 are router 60, firewall server or gate keeper appliance 70, switch 80, servers 90, 92 and mainframe 94. The intercept portal 50 and intercept management console 54 are also shown and are further described below. The master relational database management system (RDBMS) and policy manager software are installed on intercept portal 50. Key master software is installed on protected server 90 and mainframe 94, as well as on end user workstations 10, 12, 14, 16 and 18. The gate keeper software can be implemented as an appliance protecting a selected trusted virtual network (TVN) within the enterprise network.

The intercept portal 50 is a central point of initial key generation and registration. Users 10, 12, 14, 16 and 18 authenticate to the portal 50 and receive a unique software package (i.e., key master software) for their respective node. During the turn-up process users 10, 12, 14, 16 and 18 authenticate with the portal 50 using the single login used for network access as configured by the network administrator. The portal 50 verifies this authentication with the primary domain controller (PDC) and either continues with the "key master" build or terminates the attempt. The PDC is a server in a Windows NT network that maintains a read-write directory of user accounts and security information. The PDC authenticates usernames and passwords when members log into the network. Once the key master has been built, the portal 50 transfers and informs the management console 54 of the addition. The intercept administrator will then use the objective interface to drag and drop additional permission sets to the user's profile. Once the users' profiles are updated, the users 10, 12, 14, 16 and 18 are ready to access all approved resources.

Key master and gate keeper are software modules that could be simply added to existing firewalls 70 and end nodes, such as 10, 12, 14, 16 and 18. Within the firewall or appliance 70, gate keeper software provides individual session layer protection from unwanted access by controlling the initial request for connection. Node key master software provides a unique identifier for each user 10, 12, 14, 16, 18 and device; thus allowing gate keeper full recognition of who is requesting service and what service is being requested.

The intercept software (key master and gate keeper) prevents the ability to misuse resources by preventing unwanted users and non-allowed requests to make connections. Rather than terminating an existing flow, the intercept software prevents the connection all together. During times where unwanted connections are continuously being requested, intercept software will re-direct the requests to an aggregation area where security personnel can "back-through" the connection and locate the intruder. The intruder will not know that he is being tracked; thus avoidance measures will not be taken by the intruder.

Transformation/Reformation Processes

Two of the critical elements of the intercept framework are the processes of transformation and reformation. Transformation is the process of uniquely changing the values and alignment of hidden user identifiers (UID) and system identifiers (SID) that describe who the user is, what the user is attempting to use, the system being used and the active session of the on-going connection. Reformation is the process of reversing the transformed identifiers yielding the true value of each identifier. These "real" identifiers are then used to enforce access and usability policies. The objective of transformation is to provide a mechanism that prevents the transmission of usable identifiers across an open network. By transforming identifiers used by the intercept software and the TCP/IP stack before they are transmitted, potential intruders can only see what is on the wire, not what is actually being processed.

Transformation is accomplished by applying keys in a specific way that changes the original values of each identifier. These changes affect the original value and the ordering of the bits. Transformation keys are randomly selected from two key tables each containing 256 unique keys. The tables are referred to as the general key index (GKI) and the session key index (SKI), respectively. Each key has an associated key index number that points to its value. Key indexes are randomly selected by the key master software each time there is a new connection request.

The GKI table holds 256 keys that are used to change the value of an identifier. As an example, consider a UID that has a "real" value of 1234567890, a GKI key index number is randomly selected (157) and an associated key that is extracted from the GKI table. Once transformed using this key, the UID identifier's value is now changed (i.e., transformed) to 5672348901. The GKI index number is then appended to the transformed UID yielding 5672348901157.

A key index is then selected from the SKI table (e.g., 78). The SKI table holds 256 keys that are used to re-order the bits of each identifier throughout the life of the connection. Taking the above resulting number 5672348901157, the SKI key is applied transforming the number to 2319057547186. This resulting number is then used as the transmitted initial sequence number (ISN) within the TCP/IP synchronization (SYN) packet header.

As mentioned above, the intercept key master software also identifies the system being used (SID). Continuing with the above example, a computed SID is 6789012345. The SKI index number used to re-order the transformed UID number is appended yielding 678901234578. This number is then re-ordered using a third key resulting in the final acknowledgement (ACK) number 307281584697 that is included in the SYN packet header.

When the gate keeper appliance (software) intercepts the SYN packet and parses its header information, the SYN and ACK numbers are extracted. Using the third key, the software reforms the ACK number yielding the SID and SKI. The SKI is extracted and used to reform the ISN yielding a transformed UID and GKI. The GKI is used to reform the UID yielding the real UID.

Once the SYN packet has been received at its destination, the TCP/IP stack program begins parsing and processing the SYN packet normally. However, before it begins the process of verifying TCP header data, it uses the third key to reform the ACK number yielding the SID and SKI. It stores the SKI and uses it to transform/reform all incoming and outgoing packets for the duration of the connection.

Key Tables

As described above, there are two distinct key tables or arrays (GKI, SKI). Each table contains 256 128-bit keys and indexes (pointers) to each. These tables are managed and updated in one of two ways. Initially, both tables are pre-populated with all 256 keys prior to implementation in a communications network. Subsequently, the keys held in these tables can be re-populated automatically with new key values that are generated by a key generator. This automatic table feature can be scheduled based on the network owner's requirement and performed by the network's intercept software administrator.

As part of the intercept software interface and management console program, a selectable feature ("Key Table Maintenance") option can be used by the administrator. This option schedules the tables for updating and performs replication services needed to update gate keeper appliances and key master-enabled users.

The intercept system exploits the normal operational aspects of communication protocols such as Transmission Control Protocol (TCP), User Datagram Protocol (UDP) and others. Brief descriptions of connection oriented and connectionless transport protocols are described in the following sections.

Connection Oriented Protocols

Connection oriented protocols such as TCP/IP, Internetwork Packet Exchange/Sequenced Packet Exchange (IPX/SPX) and others rely on handshaking events to establish a connection. Connection establishment between TCP hosts is performed by using a three-way handshake mechanism. A three-way handshake synchronizes both ends of a connection by allowing both sides to agree upon initial sequence numbers. This mechanism guarantees that both sides are ready to transmit data and know that the other side is ready to transmit as well. This is necessary so that packets are not transmitted or re-transmitted during session establishment or after session termination. Each host randomly chooses a sequence number used to track bytes within a stream it is sending and receiving. The first host (host A) initiates a connection by sending a packet with the initial sequence number (ISN) and SYN bit set to indicate a connection request. The second host (host B) receives the SYN, records the sequence number, and replies by acknowledging the SYN (within ACK=$ISN_A$+1). The second host includes its own initial sequence number ($ISN_B$). An ACK=20 means that the host has received bytes 0 19 and expects byte 20 next. This technique is called forward acknowledgement. The first host then acknowledges all bytes the second host has sent with a forwarded acknowledgement indicating that the next byte the first host expects to receive is ACK=$ISN_B$+1. Data transfer can then begin. By investigating information about the requesting user, the intercept system can ensure that each requestor is calling for an allowable connection before the connection is completed. Additionally, the intercept system can identify the intent of the requestor and ensure that he is asking for a "normal" or "acceptable" service.

Figure 2A:
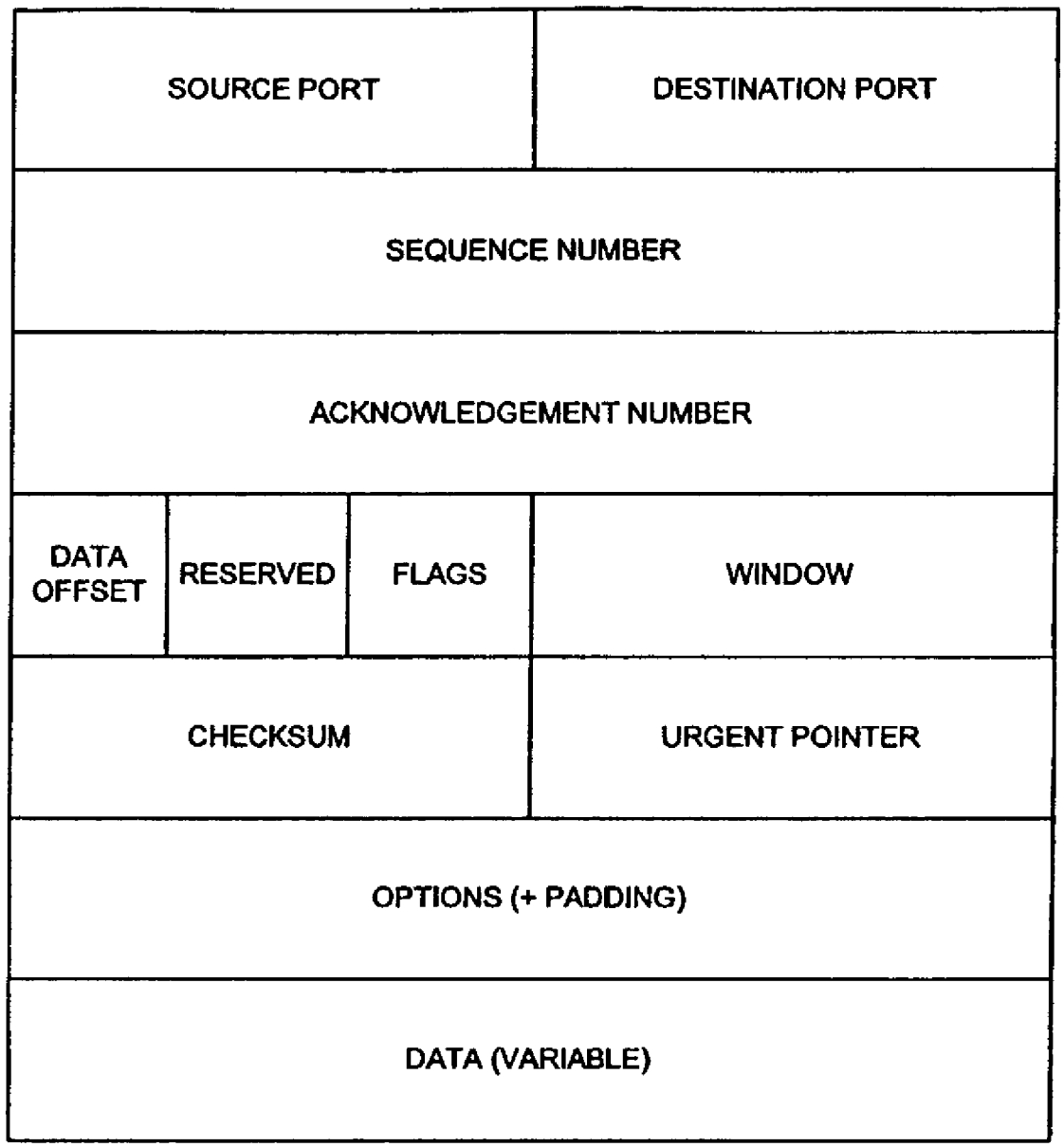
FIG. 2A illustrates the fields and overall format of a TCP packet.

The fields and overall format of a TCP packet are shown in FIG. 2A. The source port and destination port fields identify points at which upper layer source and destination processes receive TCP services. The sequence number field usually specifies the number assigned to the first byte of data in the current message. In the connection-establishment phase, this field is also used to identify an initial sequence number to be used in an upcoming transmission. The acknowledgement number field contains the sequence number of the next byte of data that the sender of the packet expects to receive. The data offset field indicates the number of 32-bit words in the TCP header. The flags field carries a variety of control information, including the SYN and ACK bits used for connection establishment, and the FIN bit used for connection termination. The window field specifies the size of the sender's receive window. This represents the buffer space available for incoming data. The checksum field indicates whether the header was damaged in transit.

Connectionless Protocols

Figure 2B:
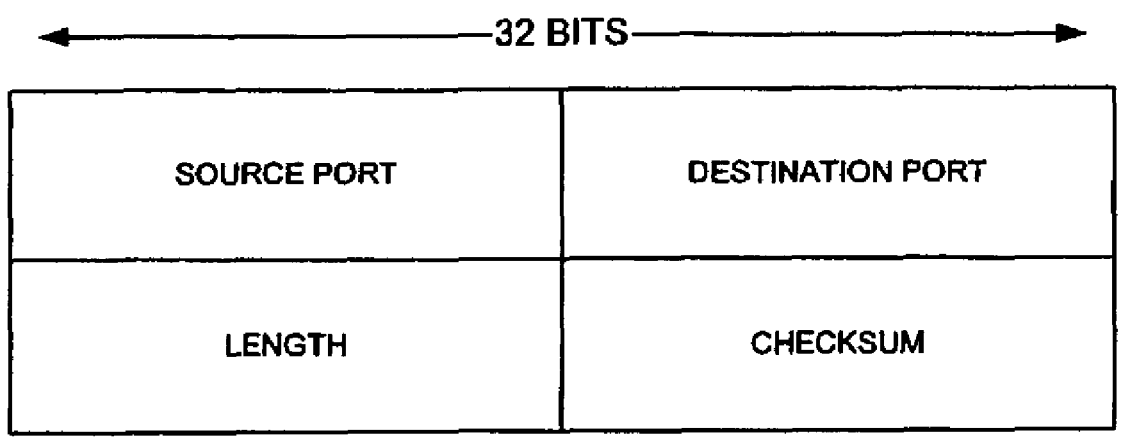
FIG. 2B illustrates the fields and format of a UDP packet.

UDP, multicast and other protocols do not utilize a handshake method of establishing a connection. UDP is a connectionless transport-layer protocol that belongs to the Internet Protocol family. UDP is basically an interface between IP and upper layer processes. UDP protocol ports distinguish multiple applications running on a single device from one another. UDP is useful in situations where the reliability mechanisms of TCP are not necessary, such as in cases were a higher-layer protocol might provide error and flow control. UDP is the transport protocol for several well-known application layer protocols, including Network File System (NFS), Simple Network Management Protocol (SNMP), and Domain Name System (DNS). The UDP packet format contains four fields as shown in FIG. 2B. These include source and destination ports, length, and checksum fields. Broadcast type flows operate in a uni-directional fashion; thus the intercept system locates unique identifiers differently than those using a connection-oriented protocol but will still prevent unwanted flows by pooling the broadcast stream and verifying the initial packet of the stream.

There are two levels of device authentication and identification providing hardware and user session security. First, information about the specific device is maintained in the key master software. This information maintains a description of the hardware and is verified each time the device is used. By placing this information within the key master software, the software itself cannot be copied and placed on other devices. Without successful authentication, no network connectivity will be permitted. Secondly, unique identifiers are created each time the device is used by a user. This information is uniquely transformed and becomes part of the normal packet structure. All unique identifiers and other unique data points are computed together forming the initial sequence number (ISN) of the request. Communicating hosts exchange ISNs during connection initialization. Each host sets two counters: sequence and acknowledgement. Held within the ISN are unique keys that identify the user and are used to grant authorization. By utilizing normal protocol operands to carry authenticated identifiers, no modification to the packet structure is required; thus, intruders will notice no differences between a non-intercept software-enabled packet and an intercept software-enabled packet. Only by having a complete knowledge of how the intercept software operates, the identification of all data points used in the ISN computation and exact formulas used could a probable breach be successful.

This initial packet along with the unique identifiers are routed to its destination as usual; however on its way to the destination the packet is picked up by the gate keeper enabled appliance or firewall. The gate keeper software intercepts synchronize (SYN) packets specifically and performs reverse algorithms to the ISN, correlates encrypted identifiers to fully qualified user name (FQUN). Application and destination identifiers are also identified. It then applies availability rules to them and either forwards the SYN to its destination or rejects and drops the request. The SYN flag is only set when establishing a TCP connection.

The two major components of the intercept system software are the intercept software-enabled firewall or appliance (gate keeper) and the intercept software-enabled node (key master).

The key master module is a software component that can be added to user workstations 10, 12, 14, 16, 18 and network resources such as server 90, mainframe 94 with reference to FIG. 1. The gate keeper module is a software component that can be added to existing firewall devices or operate as a stand-alone appliance 70 as depicted in FIG. 1. As a software solution, investments and positioning of existing firewalls can be leveraged.

Figure 3:
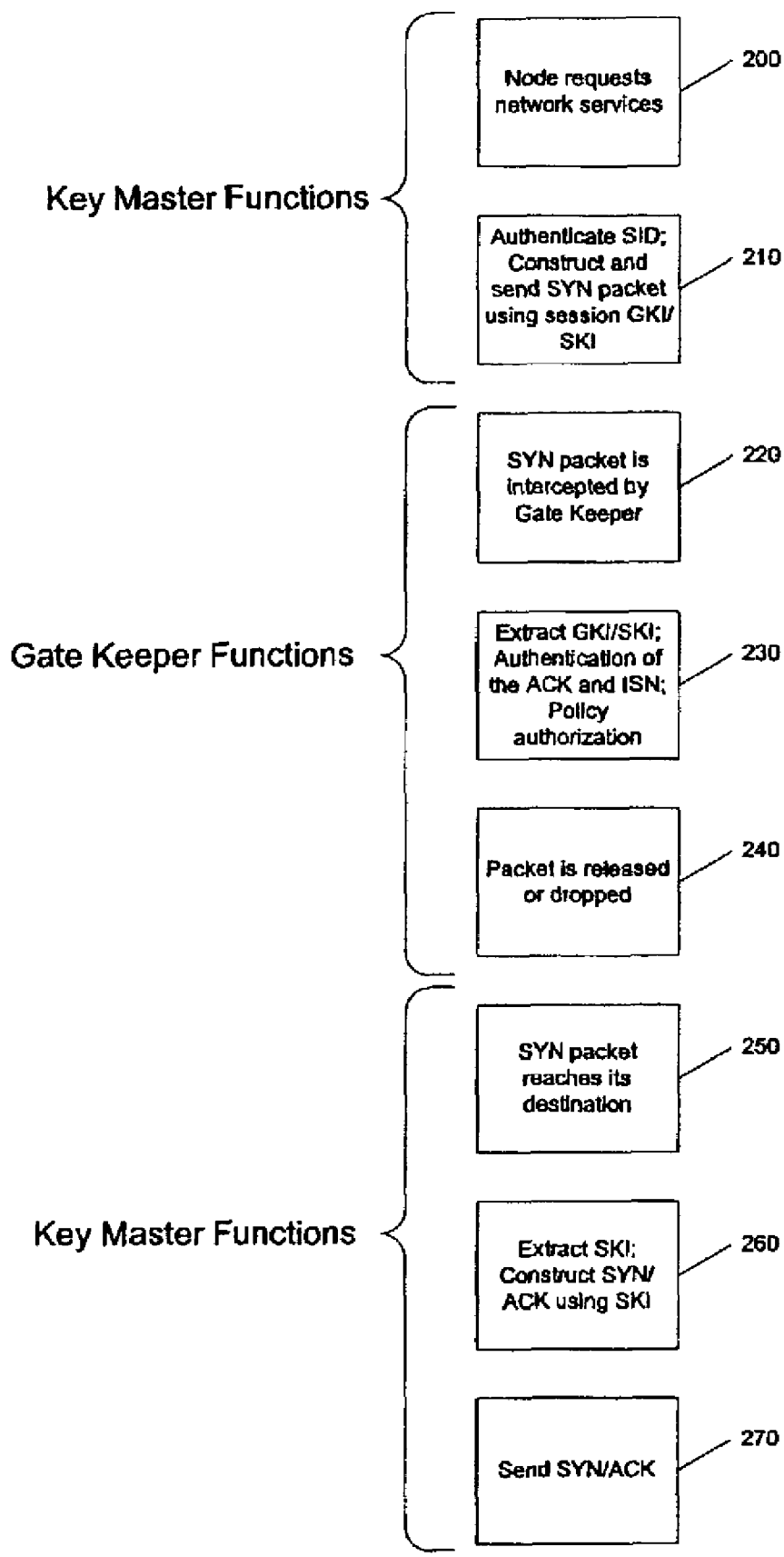
FIG. 3 illustrates a high level view of the major functions in the process flow for the key master and gate keeper intercept software in accordance with an exemplary embodiment of the present invention.

FIG. 3 illustrates a high level view of the major functions of the key master and gate keeper intercept software. Process blocks 200 and 210 indicate functions performed by the key master software at the originating node of a network connection. Process blocks 220, 230 and 240 indicate functions performed by the gate keeper software on intercepted packets intended for a network destination. Process blocks 250, 260 and 270 represent functions of the key master software performed at the receiving end (destination node) of a network connection. As indicated in process block 200, the originating station (source node) requests network services. Key master software is loaded and running in all enabled nodes, work stations, servers and intermediate devices. The key master software is responsible for the first level of authorization and construction of intercept-enabled packets. Leveraging the mechanics of the protocol, the key master software provides a method of identification and verification of both the hardware and the user. This is indicated in process block 210, which represents the functions of authenticating the system identification (SID), constructing and sending a SYN packet, using a session GKI/SKI.

The gate keeper in one embodiment is an in-line appliance that intercepts all packet flows associated with a protected trusted virtual network (TVN). Each packet that is routed in or out of a TVN is inspected in real time. Only the initial SYN packet is processed; all others are released without further delay. In process block 230, the GKI/SKI is extracted; the ACK and ISN are authenticated; and policy authorization is checked. SYN packets are investigated to ensure that known hardware and known users are requesting services from systems and applications that they are allowed to use. Using information held in the intercept SYN packet, profiles are compared to the requests. By looking up these individual profiles, decisions can be made to allow or disallow the connection request. The packet is released or dropped as indicated in process block 240.

At the receiving end of a connection, the receiving node accepts the SYN packet to begin the intercept receive process. This is indicated in process block 250 with the SYN reaching its destination node. After identification of a packet type (SYN), the ACK field is evaluated and a decision is made to further process the packet. As indicated in process block 260, the SKI is extracted and used to construct the SYN/ACK. Authorization and verification is performed by extracting and transforming the ISN and ACK data and passing it to upper layer stack processes. The destination node sends a SYN/ACK to the originating node in process block 270. The key master software toggles into conversation mode throughout the rest of the connection until the FIN/ACK process informs both the originating node and the destination node of the conversation termination.

Once the SYN is received by an intercept' system protected host, the host responds back in its usual manner. However, the protocol operands are once again modified. This modification is directed to how the destination device acknowledges the ISN. Rather than the standard ISN+1, the intercept system utilizes an intercept-enabled transformation algorithm and modifies the sequencing of the flow. If the connection request has originated from a non-intercept system enabled device, the normal rules of protocol handshaking will terminate the connection thus preventing the intrusion.

The gate keeper software includes the following components:
  Packet grabber
  Protocol factory
  Transformer
  Event broker
  Re-director
  Date store
  Message broker The packet grabber is responsible for selecting only the SYN packets of any given connection request. The packet grabber identifies SYN packets and send them to the protocol factory for further processing. Only SYN packets are grabbed.

The protocol factory is responsible for identifying the protocol and calling the proper parser for packet parsing functions.

The packet parser selects specific header and frame information about the SYN packet. It then performs look up functions to verify permissions and key identification by calling the transformer. The packet parser makes the decision to allow the connection, terminate the connection request or re-direct the request to the intercept system console. It uses the data store as a decision support tool.

The transformer reverse computes the transformed identifiers which contains unique key data. This key data identifies the user making the request. Rules are applied to this data so the packet parser can make a go/no-go decision.

The event broker executes the actions as directed by the packet parser, either allowing the connection, dropping the connection request or requesting re-direction. The event broker also logs requests and their actions.

The re-director takes data from the event broker and directs it to multiple places as defined. The data store is used to maintain key identifiers and permissions. It is automatically updated through the message broker.

The message broker provides synchronized replication of changed data so every known intercept software-enabled appliance or firewall has current up-to-date policy data.

Key master software is device driver software only. It modifies the methodology controlling the creation and interpretation of unique SYN sequence numbers and acknowledgement (ACK) numbers. Using both the digital key and fixed formulas, it generates a unique 32-bit sequence number and ACK number. Held within the sequence number are identifiers for the active session and user ID. Held within the acknowledgement number are identifiers for the hardware and transformation keys. Although intercept software creates unique numbers they adhere to all Internet Engineering Task Force (IETF) Request for Comments (RFC) standards regarding protocol use of those numbers. As such, no modifications are needed to normal infrastructure operations and packet delivery.

In order to "turn-up" a new intercept system-enabled user, the user needs to be added to the intercept system data store and have a unique key master (SID) created. The key master software utilizes the original media access control hardware (MAC) address embedded as part of the SID and determines if the requesting workstation's present MAC address is the same as the registered address. The SID is created by taking the MAC address of the user's workstation plus the actual time stamp of the addition (measured in milliseconds).

This comparison prevents unknown devices from being connected at trusted locations such as a wiring closest. Additionally, it prevents illicit copies of the key master SID from being installed on unwanted systems. If the MAC address comparison fails, key master software informs the administrator and disallows connectivity.

When the user's workstation is enabled, he can use an application resource. When the user generates a request for connection, the key master software creates a unique SYN/ISN containing a 24-bit CRC of the UID that has been transformed plus a randomly selected GKI. The UID is a fully qualified user name FQUN plus the domain name. This is computed by taking the user ID name (e.g., dshay) and the authenticated domain name and computing a 24-bit numerical value. The CRC is computed by taking the UID and computing a normal cyclic redundancy check (CRC).

These numbers are then combined and computed using a transformation algorithm to create the unique SYN/ISN. Additionally, key master software computes a unique SID by taking the MAC address of the active network interface card and the stored time stamp and creating a 24-bit CRC numerical value. A randomly selected SKI is then combined to this 24-bit number and the resulting 32-bit number is transformed to create the ACK number. Because the uniquely generated sequence number and ACK numbers are 32 bits in length, they don't alter any requirements specified by the RFCs governing the TCP/IP protocol.

The complete SYN packet is then normally routed through the network, heading towards its destination. Before it reaches its destination address; however, the packet is picked up by the gate keeper software. It begins by evaluating the ACK number. If the ACK number contains a zero value the request is recognized as an untrusted request and is processed by the exception policy. The exception policy is applied to verify a pre-existing policy for untrusted requesting sources. If the exception request is granted gate keeper assigns a unique identifiable ACK number that is understood by enabled receiving devices; if no exception policy exists the request is dropped. If the request is not identified as an exception (a non-zero ACK number), it is processed as an enabled request. As a normal enabled SYN packet, gate keeper reforms the received ACK number yielding the SID and SKI. The SKI is then used to reform the ISN yielding a transformed UID and the GKI. The GKI is then used to reform the UID yielding a real UID. Continuing the process, gate keeper then verifies the UID and selects the level of policy to apply. If no other policy is defined for the UID, the packet is released. However, if additional levels of policy are defined, gate keeper verifies each policy component. These policy components can include authorization of the hardware device by verifying the SID, application authorization by verifying the destination port identifier or any combination including all components.

From the combination of this information, the following is known:
  intercept system-enabled request packet coming from a known device;
  the identification of the user that is making the request for connection; and
  where the user wants to go (destination) and what the user wants to do (resources).

A set of permissions (i.e., policy) can now be evaluated for each individual user. If user "dshay" is authenticated to his normal domain, the intercept system will be able to recognize the user within the data store and allow him to work within his restrictions. If the user (dshay) needs to use someone else's workstation, he will still need to find an intercept system-enabled node. In addition, the user will still have to authenticate to his normal domain and be recognized by either the Primary Data Controller (PDC) or the intercept system. As discussed above, the PDC authenticates user names and passwords when members log into the network. Members only have to log into one domain to access all resources in the network.

Figure 4:
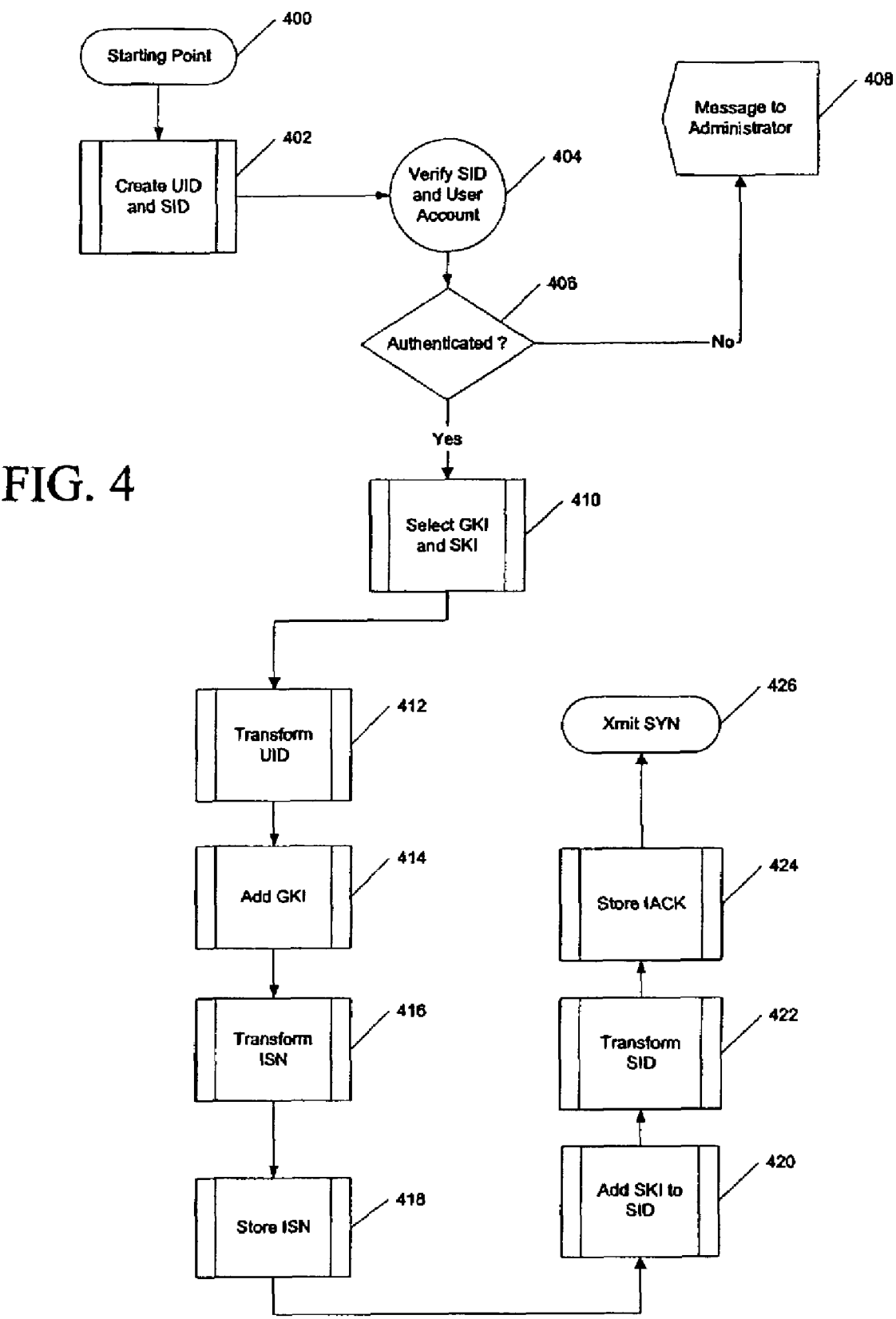
FIG. 4 illustrates the processing logic associated with requesting network connection services in accordance with an exemplary embodiment of the present invention.

FIG. 4 illustrates the processing logic implemented in the key master software to control requests from end users for network connection services. Processing starts in logic block 400 with the user performing a TCP/IP Open call requesting a connection to a network service. From an operating system perspective, end user workstations requesting a service ask the TCP services program to open a new connection request which starts the functions needed to build a request packet (SYN) and to prepare the packet for transmission.

The TCP protocol requires the establishment of a controlled connection between two devices before data can be exchanged. This connection process requires the requesting device to send an Initial Sequence Number (ISN) so that the connection can have a starting point shared by both devices. As noted previously, the ISN is a 32-bit integer that is randomly generated by the stack. The key master software takes control of the method by which this number is generated and creates an ISN that holds a previously computed UID. The UID is then used to identify the individual user making the request before the request packet is received at its destination. By using the FQUN computed earlier, a 24-bit CRC value is computed and stored in a session oriented temporary variable.

Before the connection request begins, the key master software obtains the identification of the requesting machine (SID) and the user account identification (UID). By grabbing the Media Access Control (MAC) address of the network interface card (NIC) along with the original time stamp previously stored, a 24-bit transformed SID is created. This processing step is indicated by logic block 404. Located in the key master software, this function call is executed before the Open call, therefore it controls the go/no go state. By intercepting the connection request, authorization decisions can be made before an intruder has connected to the network.

In decision block 406, a determination is made as to whether the machine (i.e., workstation) requesting connection is the same machine used during turn-up. By comparing the computed SID, the key master software can determine if the machine is the same machine used during turn-up. If the key master software has been copied to another machine, or the access request is bound to a known network interface card (NIC), the session values will not match the stored values and the request will be terminated. If the authentication check fails in decision block 406, the key master software will inform the security administrator of the failed attempt to connect as indicated in logic block 408. This message is reported and stored in the event database within the portal RDBMS. This information is used to identify and track unauthorized events.

The key master software includes two arrays of transformation keys. First a GKI used to transform the UID and second the SKI used to transform outgoing packets. Each array has index pointers that are associated with a key's value. After the UID has been computed, a GKI index and an SKI are selected for the transformation steps. This processing step is indicated in logic block 410. The previously computed UID is transformed by the GKI as indicated in logic block 412.

As indicated in logic block 414, the GKI is then added to the resulting transformed UID. The previously selected SKI is then used to transform the resulting transformed UID plus GKI as indicated in logic block 416. The resulting number is then used as the ISN and is stored in the socket buffer and is ready for transmission (logic block 418). The previously selected SKI is appended to the previously computed SID as indicated in logic block 420. The resulting number is then transformed as indicated in logic block 422. The transformed number is the IACK and is placed in the socket buffer as indicated in logic block 424. The resulting SYN packet is now ready for transmission and is delivered by the protocol transport system, as indicated by logic block 426.

Figure 5:
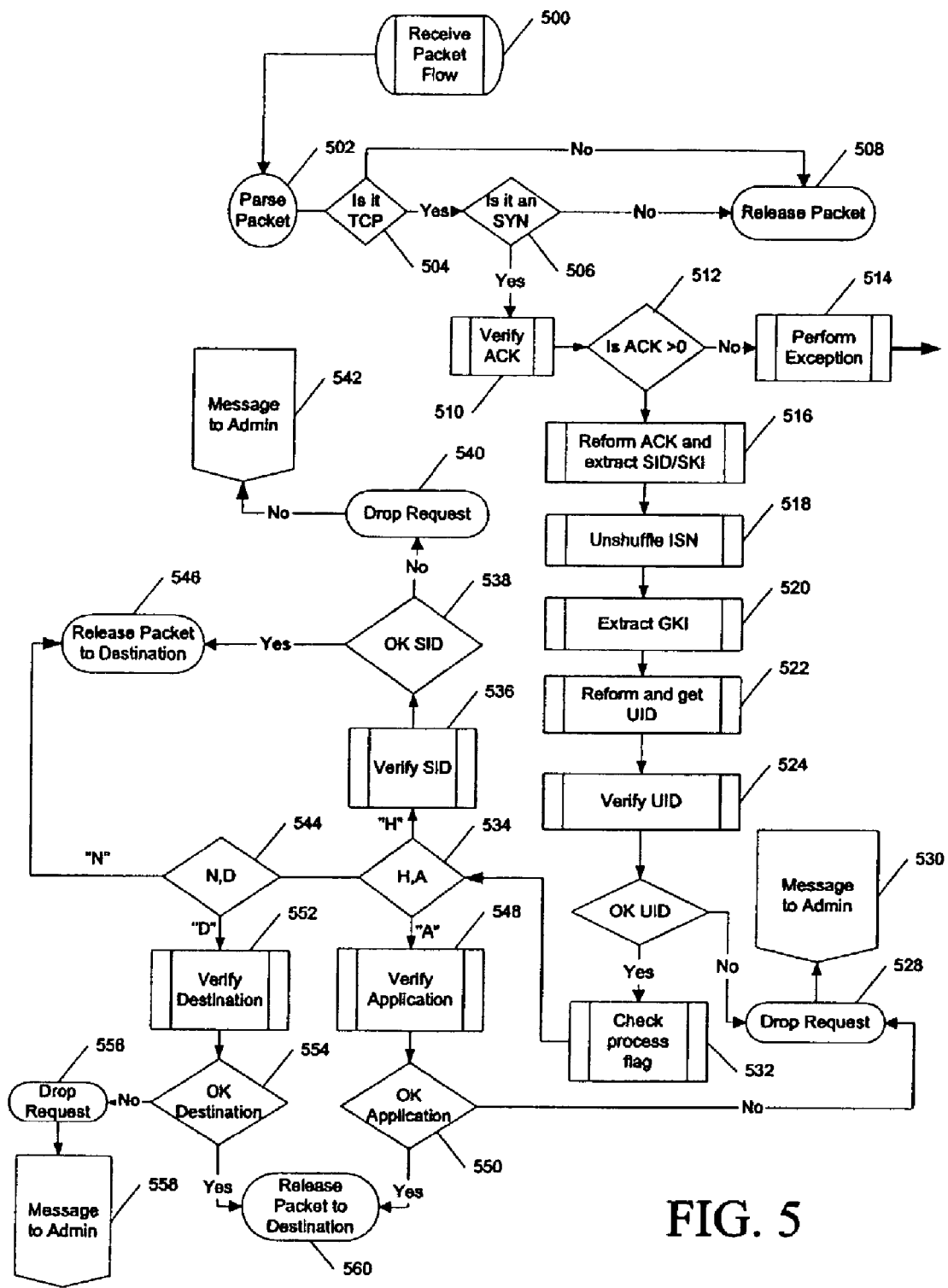
FIG. 5 illustrates the processing logic associated with the gate keeper authentication process to prevent intrusion in a communications network in accordance with an exemplary embodiment of the present invention.

The processing logic associated with the authentication process performed by the gate keeper software is illustrated in FIG. 5. As shown in FIG. 1, the gate keeper 70 is an in-line active device. It performs services similar to a typical firewall. It receives all packets that flow bi-directionally on network circuits, investigates each packet, selects only specific packets for further processing, and releases all other packets. The processing logic for the gate keeper software can be delineated into a number of processing blocks that are shown in FIG. 5. These process blocks include promiscuous packet capture; protocol identification and packet identification; parsing and fetching; transformation/reformation; authorization verification; connection action; and notification. When executing in promiscuous mode, every packet transmitted on to a protected circuit is captured and placed in the input buffer. Protocol identification is performed by evaluating the IP header data in the packet. Once the protocol type code is identified as TCP, the packet header is again evaluated for an active SYN flag. If the packet is a SYN packet, it is then further processed. If it is not an SYN packet, the packet is immediately released and sent on to its destination.

Figure 6:
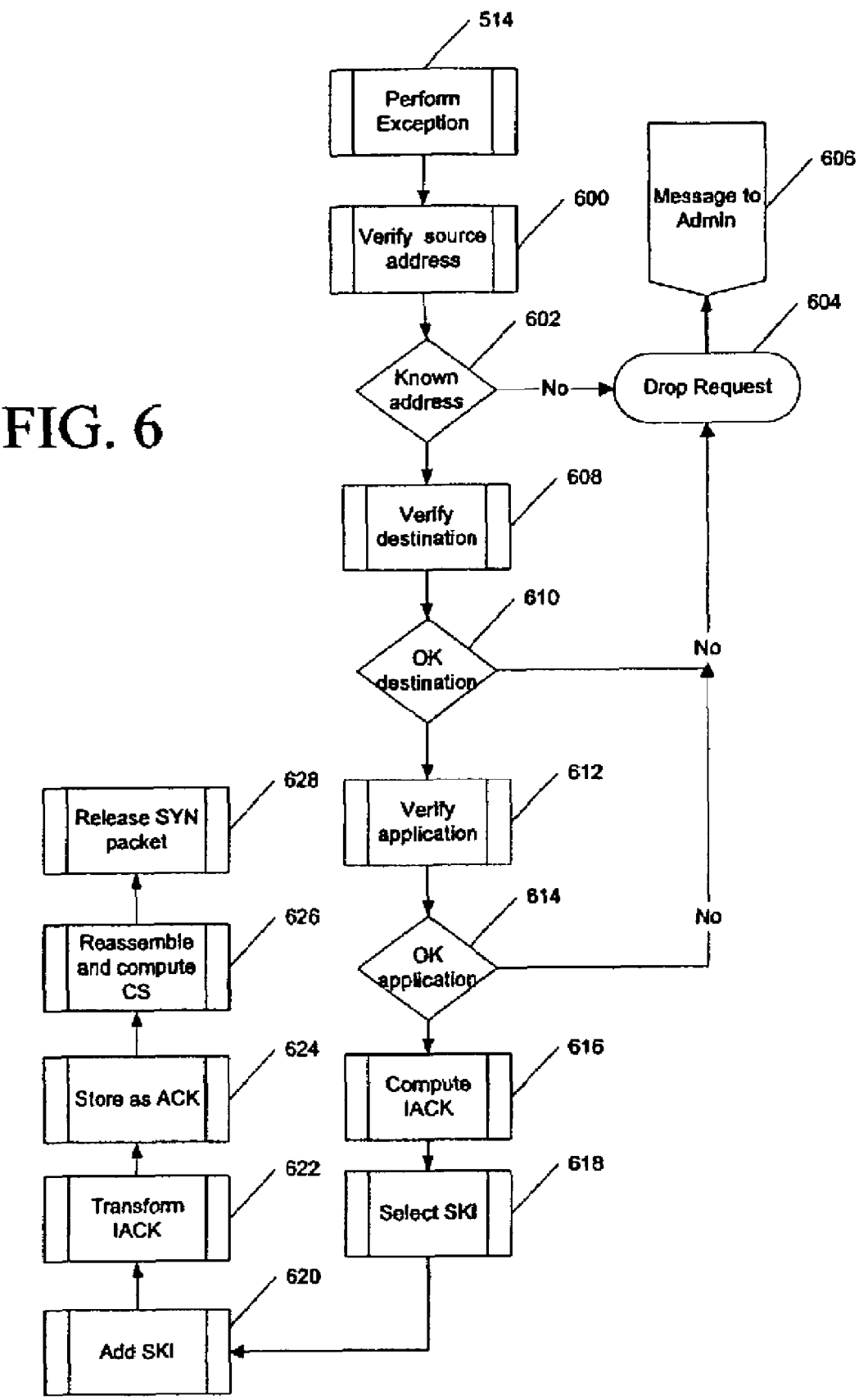
FIG. 6 illustrates the processing logic associated with the "perform exception" process in accordance with an exemplary embodiment of the present invention.

Processing commences in logic block 500 with the step of receiving a packet flow from a node. In step 502, the received packet is parsed. In decision block 504, a test is made to determine if the packet is a TCP packet. If it is, then in decision block 506, a test is made to determine if the packet is an SYN packet. If it is not a SYN packet, the packet is released as indicated in step 508. Once the packet has been declared a TCP packet with the SYN flag set, the ACK field is verified. In decision block 512, if the ACK field has a value greater than zero, then the ACK value and extracted SID/SKI are reformed as indicated in logic block 516. If the ACK field has a value of zero, an exception routine is then performed as indicated in logic block 514. Further details associated with the performance exception routine are depicted in FIG. 6. Following the reform process in logic block 516, the ISN is reformed. The reformed ISN reveals the transformed UID and the GKI as indicated in logic block 518. The GKI is then extracted as indicated in logic block 520. Using the GKI, the transformed UID is reformed to reveal the user identification (UID) as indicated by logic block 522. The resulting UID is verified in logic block 524. If this is found to be a bad index number, the connection request is dropped. The resulting UID is then searched for in the data store containing all known user profiles. A test is made in decision block 526 to determine if the UID has been found. If the UID has been found, then it is passed on to the next processing block, logic block 532 for further authentication. If the resulting UID is not found (decision block 526), the connection request is dropped (logic block 528) and a message is sent to the administrator as indicated in block 530.

After the UID has been found (yes path out of decision block 526), the UID process policy is inspected in logic block 532. This inspection informs the gate keeper software of the level of policy in effect for this user. The process flags the five levels of policy to apply to each user. These policies provide for the inspection of hardware (H), requested application (A), requested destination (D), and no policy at all (N). In decision block 534, a test is made to determine if there is a hardware or a requested application policy defined for the user. If a hardware policy is defined, the SID is then verified as indicated in logic block 536. The SID identifies the source node making the request. A test is performed in decision block 538 to determine if the SID has been found. If the SID has not been found, then the request is dropped (logic block 540) and a message is sent to the administrator as indicated in block 542. If the test in decision block 538 passes, the packet is released to the destination, as indicated in logic block 546. In decision block 534, if an application policy is defined, the destination port is verified (logic block 548). In decision block 550, a test is made to determine if the user is authorized to access the requested application. If the user is so authorized, the packet is released to the destination as indicated in logic block 560. Otherwise, the request is dropped (logic block 528) and a message is sent to the administrator as indicated in logic block 530. If neither a hardware policy nor a requested application policy is defined for the user, a test is then made in decision block 544 to determine if there is either a requested destination policy or no policy at all defined for the user. If a requested destination policy is defined, a destination port is verified in logic block 552. If a destination port is accessible to the user, then the packet is released to the destination as indicated in logic block 560. If in decision block 554, the destination port is not available to the user, the request is dropped (logic block 556) and a message is sent to the administrator, as indicated in block 558.

FIG. 6 illustrates the processing logic associated with the "performing exception" process. When the value held in the ACK field is zero, the gatekeeper software knows that the packet has originated from an untrusted source. The exception routine is executed because of the requirement to provide selected untrusted source access. The origination source address is extracted from the IP layer in the verified source address logic block 600. The extracted source address is then verified from the exception table as indicated in decision block 602. If this test fails, the connection request is dropped (logic block 604) and a message is sent to the administrator in logic block 606. If the extracted source address is verified as a non-address in decision block 602, the requested destination is then verified by extracting the destination address in the IP layer. This is indicated in logic block 608. The extracted destination address is then verified from the exception table in decision block 610. If the test fails, the request is dropped in logic block 604. If the extracted destination address is verified in decision block 610, then the packet is further tested by extracting the destination port number from the TCP layer to verify the application request in logic block 612. The destination port number is then verified in the exception table as indicated in decision block 614. If the test fails, the request is dropped in logic block 604. If the test passes in decision block 614, the request is then ready for transformation. This transformation occurs in logic block 616 with the generation of a unique initial ACK number (IACK). This unique number will be authenticated by the key master software at the destination node as a recognized gate keeper-induced number. An SKI is selected next, as indicated in logic block 618. The selected SKI is then added to the IACK in logic block 620. The resulting number is then transformed in logic block 622 and stored as the ACK in logic block 624. The SYN packet is finally reassembled and the CHECKSUM is recalculated in logic block 626. The SYN packet is then released as indicated in logic block 628.

Figure 7:
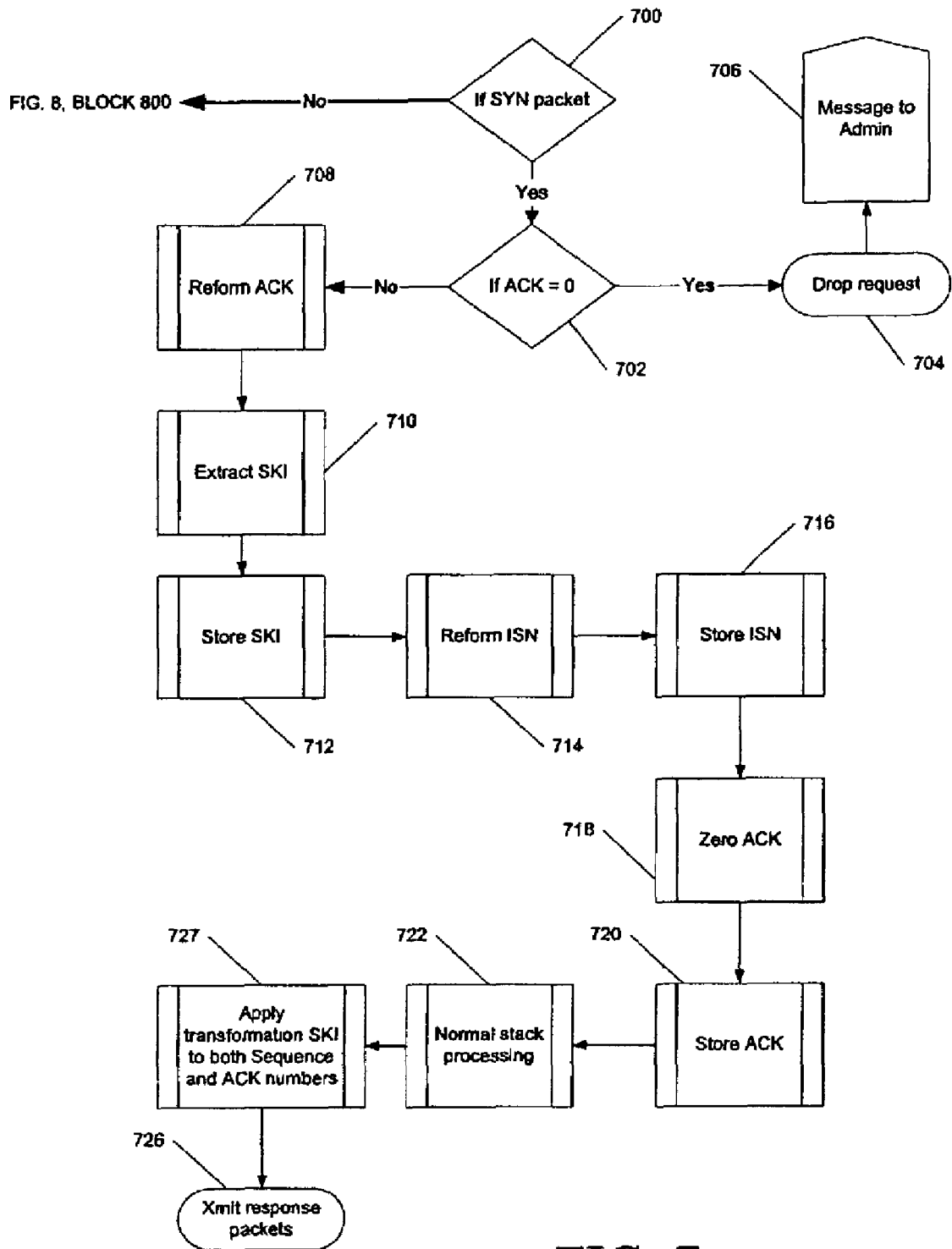
FIG. 7 illustrates the processing logic associated with call setup and response at a destination in accordance with an exemplary embodiment of the present invention.

FIG. 7 illustrates the processing logic associated with call set up and response from a destination node, after receiving the packet from gate keeper appliance 70. Processing starts in decision block 700 with a test to determine if an incoming packet is an SYN packet. The incoming packet is inspected and tested for the SYN flag being set. If the SYN flag is set in the packet, set up processing is required. If the SYN flag is not set, the packet is not an SYN packet and the packet is deemed as being associated with an established connection and is processed differently (see FIG. 8). If the SYN flag is set, then a test is performed in decision block 702 to determine if the ACK field is equal to zero. This test protects against untrusted nodes establishing a connection. If the ACK field is zero, the packet is dropped in logic block 704 and a message sent to the administrator in block 706. If the ACK field is non-zero, further connection set up processing is performed. The ACK is reformed utilizing the static routine in logic block 708. The SKI is extracted from the transformed ACK number as indicated in logic block 710. The extracted SKI is then stored in a buffer variable (logic block 712) and is used throughout the conversation. Next, as indicated in logic block 714, the ISN is reformed using the SKI to reveal the real sequence number. The resulting real sequence number is stored in the buffer as indicated in logic block 716. The ACK number is set to a zero value in logic block 718 with the zero value stored in the buffer in logic block 720. The resulting stored numbers (SEQ+ACK) are processed using normal stack processing, as indicated in logic block 722. Before the tcp_send( ) function is executed, the sequence and ACK numbers are transformed using the stored SKI as indicated in logic block 724. The response packet is then transmitted as indicated in logic block 726.

Figure 8:
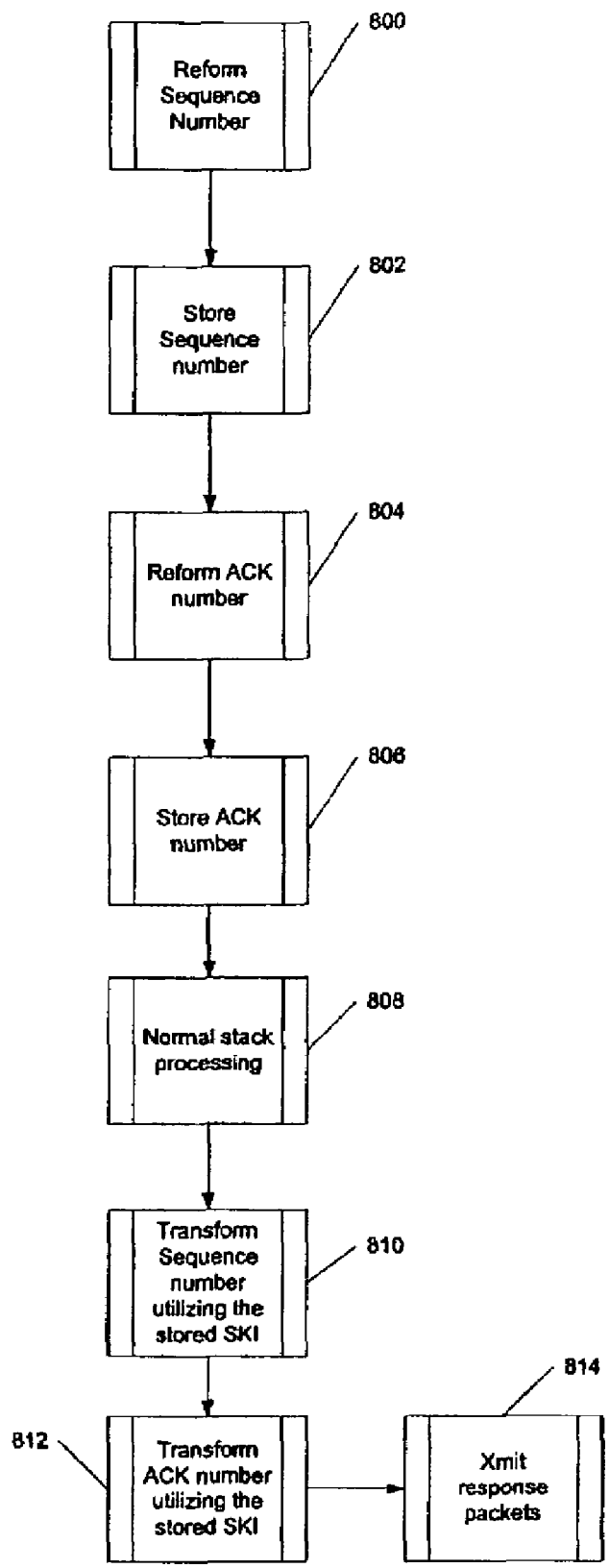
FIG. 8 illustrates the processing logic associated with packet flow after a connection is established between two nodes in accordance with an exemplary embodiment of the invention.

FIG. 8 illustrates the non-SYN packet processing flow that is executed after a connection has been established. Using the SKI stored during connection set up, the sequence number is reformed to reveal the true sequence number as indicated in logic block 800. The resulting sequence number is then stored in the receive buffer as indicated in logic block 802. Using the previously stored SKI, the ACK number is reformed to reveal the real ACK number in logic block 804. The resulting ACK number is then stored in the receive buffer in logic block 806. The packet and its data then go through normal stack processing as indicated in logic block 808. As the packet is processed by the stack and readied for transmission, the sequence number is once again transformed using the stored SKI in logic block 810. The normally produced ACK number is also transformed using the stored SKI in logic block 812. The packet is then placed in the transmit buffer by the stack and transmitted to its destination in logic block 814.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The techniques of the present invention can also be embedded in a computer program product, which comprises part or all of the features enabling the implementation of the methods described herein, and which, when loaded in a computer system, is able to carry out these methods.

Computer program in the present context mean any expression, in any language, code or notation, of a set of instructions intended to cause a system having an information processing capability to perform a particular function either directly or after either or both of the following occur: a) conversion to another language, code or notation; b) reproduction in a different material form. Computer program also encompasses hard-wired instructions embedded in an electronic device including semiconductor chips or cards, network appliances, routers, switches, servers, firewalls and client devices such as network computers, workstations, desktop computers, laptop computers and handheld devices. Specifically, a number of functions performed at the protocol or packet level can be embedded in Application Specific Integrated Circuits (ASICs). Such functions can include the parsing or routing of packets. The invention can also be embedded in single board computers (SBCs),with a Linux operating system and silicon-based data storage. Multiple boards can be installed in slots in a chassis as "blades" (similar to router blades in a router chassis) thus providing multiple gate keeper appliances.

The corresponding structures, materials, acts, and equivalents of any mean plus function elements in any claims are intended to include any structure, material or acts for performing the function in combination with the other claimed elements as specifically claimed.

While the invention has been particularly shown and described with reference to a preferred embodiment thereof, it will be understood by those skilled in the art that various other changes in form and detail may be made without departing from the spirit and scope of the invention.

The invention claimed is:

1. A method for preventing unauthorized access to a specific resource within a computer network, comprising:
    assigning a unique, non-dynamic system identifier (SID) to each authorized computer within the network;
    assigning a unique user identifier (UID) to each authorized user of the network;
    defining policy profiles for authorized computers and for authorized users of the network, wherein each policy profile identifies rights of access to resources within the network for the authorized users and the authorized computers;
    upon initiation of a TCP/IP communication attempt for access to the specific resource, wherein the communication attempt is initiated by a specific authorized user logged into a specific authorized computer and wherein the communication attempt includes a synchronization packet having a SEQ and an ACK field, inserting the UID of the specific authorized user and the SID of the specific authorized computer into the SEQ and ACK fields of the synchronization packet;
    intercepting the synchronization packet within the computer network;
    extracting the UID and SID from the SEQ and ACK fields of the synchronization packet to identify the specific authorized user and the specific authorized computer initiating the communication attempt; and
    allowing the communication attempt with the specific resource as a function of the policy profile of the specific authorized user and of the policy profile of the specific authorized computer.

2. The method of claim 1 wherein the SID is assigned based on one or more constant identifiers obtained from hardware associated with the respective authorized computer.

3. The method of claim 1 further comprising the step of encrypting the SID prior to inserting the SID into the synchronization packet.

4. The method of claim 3 further comprising the step of decrypting the SID after intercepting the synchronization packet.

5. The method of claim 3 wherein the SID is encrypted using at least one transformation key.

6. The method of claim 5 wherein the transformation key is selected dynamically from a table of transformation keys.

7. The method of claim 1 further comprising the step of encrypting the UID prior to inserting the UID into the synchronization packet.

8. The method of claim 7 further comprising the step of decrypting the UID after intercepting the synchronization packet.

9. The method of claim 7 wherein the UID is encrypted using at least one transformation key.

10. The method of claim 9 wherein the transformation key is selected dynamically from a table of transformation keys.

11. The method of claim 1 further comprising the step of recording the communication attempt in a database.

12. The method of claim 1 further comprising the step of notifying a network administrator if the communication attempt is not allowed.

13. The method of claim 1 further comprising the step of logging the communication attempt if the communication attempt is not allowed.

14. The method of claim 1 wherein the specific resource is a database.

15. The method of claim 1 wherein the specific resource is an application.

16. The method of claim 1 wherein the specific resources is another authorized computer of the network.

17. A method of monitoring a TCP/IP communication attempt within a computer network, comprising:
    assigning a unique, non-dynamic system identifier (SID) to each authorized computer within the network;
    assigning a unique user identifier (UID) to each authorized user of the network; defining policy profiles for authorized computers and for authorized users of the network, wherein each policy profile identifies rights of access to resources within the network for the authorized users and the authorized computers;
    upon initiation of a TCP/IP communication attempt with a requested resource within the network by a specific authorized user logged into a specific authorized computer, inserting the UID of the specific authorized user and the SID of the specific authorized computer into SEQ and ACK fields of a synchronization packet associated with the TCP/IP communication attempt;
    intercepting the synchronization packet within the computer network and prior to access of the requested resource;
    extracting the UID and SID from the SEQ and ACK fields of the synchronization packet to identify the specific authorized user and the specific authorized computer initiating the communication attempt;
    allowing the communication attempt with the requested resource to proceed; and
    logging the communication attempt in a database to maintain a record of the specific authorized user and the specific authorized computer initiating the communication attempt.

18. The method of claim 17 wherein the SID is assigned based on one or more constant identifiers obtained from hardware associated with the respective authorized computer.

19. The method of claim 17 further comprising the step of encrypting the SID prior to inserting the SID into the synchronization packet.

20. The method of claim 19 further comprising the step of decrypting the SID after intercepting the synchronization packet.

21. The method of claim 19 wherein the SID is encrypted using at least one transformation key.

22. The method of claim 21 wherein the transformation key is selected dynamically from a table of transformation keys.

23. The method of claim 17 further comprising the step of encrypting the UID prior to inserting the UID into the synchronization packet.

24. The method of claim 23 further comprising the step of decrypting the UID after intercepting the synchronization packet.

25. The method of claim 23 wherein the UID is encrypted using at least one transformation key.

26. The method of claim 25 wherein the transformation key is selected dynamically from a table of transformation keys.

27. The method of claim 17 wherein the requested resource is a database.

28. The method of claim 17 wherein the requested resource is an application.

29. The method of claim 17 wherein the specific resources is another authorized computer of the network.

* * * * *